(12) United States Patent
Hirai et al.

(10) Patent No.: US 11,841,575 B2
(45) Date of Patent: Dec. 12, 2023

(54) LIQUID CRYSTAL DISPLAY DEVICE

(71) Applicant: Sharp Display Technology Corporation, Kameyama (JP)

(72) Inventors: Akira Hirai, Kameyama (JP); Yuichi Kawahira, Kameyama (JP); Akira Sakai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/134,517

(22) Filed: Apr. 13, 2023

(65) Prior Publication Data

US 2023/0333427 A1 Oct. 19, 2023

(30) Foreign Application Priority Data

Apr. 15, 2022 (JP) .................................. 2022-067744

(51) Int. Cl.
*G02F 1/1335* (2006.01)
*G02F 1/1368* (2006.01)
*G02F 1/1343* (2006.01)

(52) U.S. Cl.
CPC ...... *G02F 1/133531* (2021.01); *G02F 1/1368* (2013.01); *G02F 1/1343* (2013.01); *G02F 1/133512* (2013.01); *G02F 1/133514* (2013.01); *G02F 1/133528* (2013.01)

(58) Field of Classification Search
CPC .................. G02F 1/1333; G02F 1/1335; G02F 1/133512; G02F 1/133514; G02F 1/133528; G02F 1/133531; G02F 1/1343; G02F 1/134363; G02F 1/134372; G02F 1/1362; G02F 1/136222; G02F 1/1368
See application file for complete search history.

(56) References Cited

U.S. PATENT DOCUMENTS

| 2009/0190071 A1 | 7/2009 | Kubota et al. |
| 2011/0211136 A1 | 9/2011 | Kubota et al. |
| 2023/0056588 A1* | 2/2023 | Yang ................. G02F 1/133562 |

FOREIGN PATENT DOCUMENTS

JP 5226330 B2 7/2013

* cited by examiner

*Primary Examiner* — Thoi V Duong
(74) *Attorney, Agent, or Firm* — ScienBiziP, P.C.

(57) ABSTRACT

A liquid crystal display device includes a first polarizing plate, a first substrate including a thin-film transistor, a liquid crystal layer containing liquid crystal molecules, a second substate, a second polarizing plate, and a backlight. The first polarizing plate, the first substate, the liquid crystal layer, the second substrate, the second polarizing plate, and the backlight are arranged in this order. The first substrate has a display area and a frame area placed on an outer edge of the display region. The liquid crystal display device has an ink layer between the frame area of the first substrate and the first polarizing plate. The liquid crystal display device has an internal reflectance ratio y of 0.2 to 0.3. The internal reflectance ratio y is expressed by Formula (1-1).

10 Claims, 7 Drawing Sheets

LIQUID CRYSTAL DISPLAY DEVICE

BACKGROUND

1. Field

The present disclosure relates to a liquid crystal display device.

2. Description of the Related Art

Liquid crystal display devices are display devices that utilize a liquid crystal material for display purposes. Typically, liquid crystal display devices are of such a display type that as shown in FIG. 11, a liquid crystal display panel 100A having a liquid crystal layer 40A between a TFT (thin-film transistor) substrate 30A and a CF (color filter) substrate 50A is illuminated with light from a backlight 6A and, by changing the alignment of liquid crystal molecules by applying a voltage to a liquid crystal composition, the amount of light that is transmitted through the liquid crystal display panel 100A is controlled. Liquid crystal display devices are used in a wide range of areas with the exploitation of features such as low profiles, light weights, and low power consumption.

A conventional liquid crystal display device has a frame area provided on the outer edge of a display area of the liquid crystal display panel for the purpose of hiding, for example, wires, members, and gaps. The frame area is usually shielded from light, for example, by resin. In recent years, from the point of view of operability, design qualities, or other features, more and more liquid crystal display devices have employed a so-called flat design, i.e. a one-board-like design, in which the display area of the liquid crystal display panel and the frame area are for example covered in their entirety with a cover glass.

For example, Japanese Patent No. 5226330 discloses, as an example of a liquid crystal display device, a liquid crystal display device including a TFT substrate having an arrangement of pixel electrodes and a counter substrate having formed therein color filters corresponding separately to each of the pixel electrodes. In this device, a polarizing plate bonded to the counter substrate and a face plate for protection from an external force are bonded together by ultraviolet-curable resin, and on an inner side of the face plate, a light-blocking film is formed in the shape of a frame by printing black ink. In Japanese Patent No. 5226330, the generation of bubbles during the bonding of the face plate and the polarizing plate is avoided by adjusting the ingredients of the black ink and the amounts thereof.

FIG. 11 is a cross-sectional schematic view of a common liquid crystal display device. FIG. 12 is a schematic view of the liquid crystal display device 1A shown in FIG. 11 as seen from a viewing screen side. For convenience, FIG. 11 omits to illustrate a pair of polarizing plates that are usually placed on both sides, respectively, of a liquid crystal display panel (i.e. a portion from the CF substrate 50A to the TFT substrate 30A of FIG. 11). In the common liquid crystal display device LA, the CF substrate 50A is placed at the viewing screen side (see FIG. 11). Typically, the CF substrate 50A includes R (red), G (green), and B (blue) color filters (subpixels) 71A formed in a display area 300A, a black matrix 72A, formed in the display area 300A, that divides the color filters from one another, and a black matrix (310A) formed in the shape of a frame around the display area 300A for the purpose of blocking unwanted outside light that may enter the display area. This frame-shaped black matrix does not give a great sense incongruity in outward appearance, as it is formed to extend from the black matrix 72A situated within the display area 300A.

Incidentally, in recent years, more and more liquid crystal display devices have employed a flat design as mentioned above. A liquid crystal display device with a liquid crystal display panel whose surface is entirely flat is referred to as "four-side full-flat liquid crystal display device", and a liquid crystal display device with a liquid crystal display panel that is flat on three sides is referred to as "three-side flat liquid crystal display device". As a technique for achieving a three-side flat or four-side full-flat liquid crystal display device, the inventors studied a structure (referred to as "reversed structure") in which the placement of a TFT substrate and a CF substrate is reversed so that the TFT substate, which is larger in substrate size than the CF substrate, is placed at the viewing screen side.

FIG. 13 is a cross-sectional schematic view of a liquid crystal display device 1B of this reversed structure. In the liquid crystal display device 1B, a TFT substrate 30B, a liquid crystal layer 40B, and a CF substrate 50B are arranged in this order from the viewing screen side, and a backlight 6B is placed behind the CF substrate 50B. FIG. 14 is a schematic view of the liquid crystal display device 1B shown in FIG. 13 as seen from the viewing screen side. For convenience, FIG. 13 omits to illustrate a pair of polarizing plates that are usually placed on both sides, respectively, of a liquid crystal display panel (i.e. a portion from the TFT substrate 30B to the CF substrate 50B of FIG. 13). In the TFT substrate 30B, metal wires or other components for liquid crystal displays are present around a display area 300B, with the result that a linear pattern is seen. To address this problem, the inventors studied a method for printing black ink in the shape of a frame (310B) around the display area 300B as a measure to hide these wires or other components from the point of view of design qualities. However, the inventors found that employing this method allows brightness and the tints of metallic species of metal wires formed on top of the TFT substrate 30B to be observed in the display area 300B in the absence of the application of a voltage (off state) but may fail to give a sense of congruity in outward appearance between the display area 300B and the frame area 310B, whose predominant color is black. In this case, there are problems in terms of design qualities of the liquid crystal display device (and the liquid crystal display panel). In the display area 300B, color filters 71B and a black matrix 72B too are seen.

Such a loss of a sense of congruity in outward appearance is considered to be due to a difference in reflectance. That is, it is considered to be because, in the display area 300B, the reflectance of incident light from outside is made higher than that of the black ink of the frame area 310B due to the effect of the metal wires or other components formed on top of the TFT substrate 30B. To address this problem, the inventors considered, for example, matching reflectances between the display area 300B and the frame area 310B. However, in this case, the brightness of the frame area 310B was so conspicuous that no sense of congruity in outward appearance was given. This is considered to be due to a difference in reflection. In the display area 300B, incident light from outside is regularly reflected mostly by the metal wires or other components formed on top of the TFT substrate 30B, and in the frame area 310B, the incident light is diffusedly reflected mostly by resin contained in the ink. The frame area 310B, in which diffuse reflection is predominant, is more susceptible to incident light from outside; therefore, no sense of congruity in outward appearance is given even by matching reflectances between the display area 300B and the frame area 310B.

Japanese Patent No. 5226330, which gives no description discussing the reflectance or tint of ink, can be judged to have failed to take into account a sense of congruity in outward appearance between a display area and a frame area. The liquid crystal display device described in Japanese Patent No. 5226330 is also structured such that the CF substrate is placed at the viewing screen side, and at a side of the CF substrate that faces the viewing screen side, a face plate formed of glass, i.e. a so-called cover glass, is provided for the purpose of protecting the liquid crystal display panel. Such a device has had room for further ingenious improvement in design qualities. Further, while there has been a strong demand in recent years that a liquid crystal display device be low in profile, light in weight, and low in price, there has been room for ingenuity to achieve a device that more sufficiently meets the demand.

It is desirable to provide a liquid crystal display device with good design qualities that gives a sense of congruity in outward appearance.

SUMMARY

According to an aspect of the disclosure, there is provided a liquid crystal display device including a first polarizing plate, a first substrate including a thin-film transistor, a liquid crystal layer containing liquid crystal molecules, a second substate, a second polarizing plate, and a backlight. The first polarizing plate, the first substate, the liquid crystal layer, the second substrate, the second polarizing plate, and the backlight are arranged in this order. The first substrate has a display area and a frame area placed on an outer edge of the display region. The liquid crystal display device has an ink layer between the frame area of the first substrate and the first polarizing plate. The liquid crystal display device has an internal reflectance ratio y of 0.2 to 0.3. The internal reflectance ratio y is expressed by Formula (1-1) as follows:

$$y = Y_2/Y_1 \quad (1\text{-}1),$$

where $Y_2$ denotes an internal reflectance (%) of the frame area as expressed by a Y value of XYZ color coordinates and $Y_1$ denotes an internal reflectance (%) of the display area as expressed by a Y value of XYZ color coordinates. $Y_2$ and $Y_1$ are calculated by Formulas (1-2) and (1-3), respectively, as follows:

$$Y_2 = Y_{A2} - Y_B \quad (1\text{-}2)$$

$$Y_1 = Y_{A1} - Y_B \quad (1\text{-}3),$$

where $Y_{A2}$ denotes a reflectance (%) of the frame area, $Y_{A1}$ denotes a reflectance (%) of the display area, and $Y_B$ denotes a surface reflectance (%) of the first polarizing plate.

Further, the liquid crystal display device described above may have an internal reflectance ratio x of 0.2 to 0.3. The internal reflectance ratio x may be expressed by Formula (2-1) as follows:

$$x = X_2/X_1 \quad (2\text{-}1),$$

where $X_2$ denotes an internal reflectance (%) of the frame area as expressed by an X value of XYZ color coordinates and $X_1$ denotes an internal reflectance (%) of the display area as expressed by an X value of XYZ color coordinates, $X_2$ and $X_1$ are calculated by Formulas (2-2) and (2-3), respectively, as follows:

$$X_2 = X_{A2} - X_B \quad (2\text{-}2)$$

$$X_1 = X_{A1} - X_B \quad (2\text{-}3),$$

where $X_{A2}$ denotes a reflectance (%) of the frame area, $X_{A1}$ denotes a reflectance (%) of the display area, and $X_B$ denotes a surface reflectance (%) of the first polarizing plate.

Further, the liquid crystal display device described above may have an internal reflectance ratio z of 0.2 to 0.3. The internal reflectance ratio z may be expressed by Formula (3-1) as follows:

$$z = Z_2/Z_1 \quad (3\text{-}1),$$

where $Z_2$ denotes an internal reflectance (%) of the frame area as expressed by a Z value of XYZ color coordinates and $Z_1$ denotes an internal reflectance (%) of the display area as expressed by a Z value of XYZ color coordinates, $Z_2$ and $Z_1$ are calculated by Formulas (3-2) and (3-3), respectively, as follows:

$$Z_2 = Z_{A2} - Z_B \quad (3\text{-}2)$$

$$Z_1 = Z_{A1} - Z_B \quad (3\text{-}3),$$

where $Z_{A2}$ denotes a reflectance (%) of the frame area, $Z_{A1}$ denotes a reflectance (%) of the display area, and $Z_B$ denotes a surface reflectance (%) of the first polarizing plate.

DESCRIPTION OF THE EMBODIMENTS

The following describes liquid crystal display devices according to embodiments of the present disclosure. The present disclosure is not limited to the contents of descriptions given in the following embodiments but may be subject to appropriate design change to such an extent as to fulfill the configuration of the present disclosure.

Embodiment 1

Figure 1:
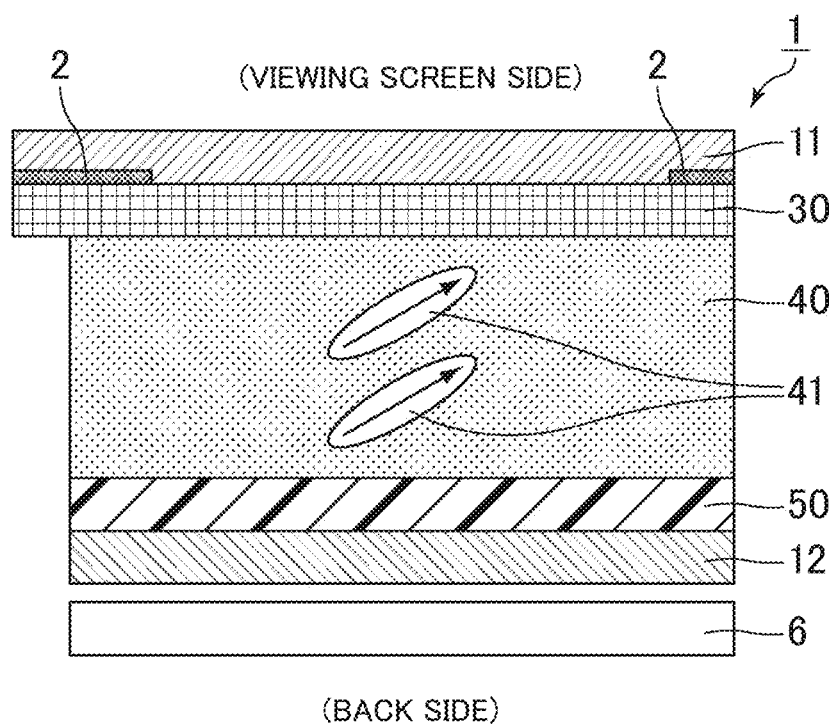
FIG. 1 is a cross-sectional schematic view showing an example of a liquid crystal display device of Embodiment 1.

FIG. 1 is a cross-sectional schematic view showing an example of a liquid crystal display device according to the present embodiment. As shown in FIG. 1, the liquid crystal display device 1 includes, in order from a viewing screen side to a back side, a first polarizing plate 11, a first substrate 30 including a thin-film transistor (also referred to as "TFT"), a liquid crystal layer 40 containing liquid crystal molecules 41, a second substrate 50, a second polarizing plate 12, and a backlight 6. The liquid crystal display device 1 has an ink layer 2 between a frame area 310 (see FIG. 2) of the first substrate 30 and the first polarizing plate 11. The term "viewing screen side" herein means a side that is closer to a screen (display screen) of the liquid crystal display device, and the term "back side" herein means a side that is further away from the screen (display screen) of the liquid crystal display device.

Figure 2:
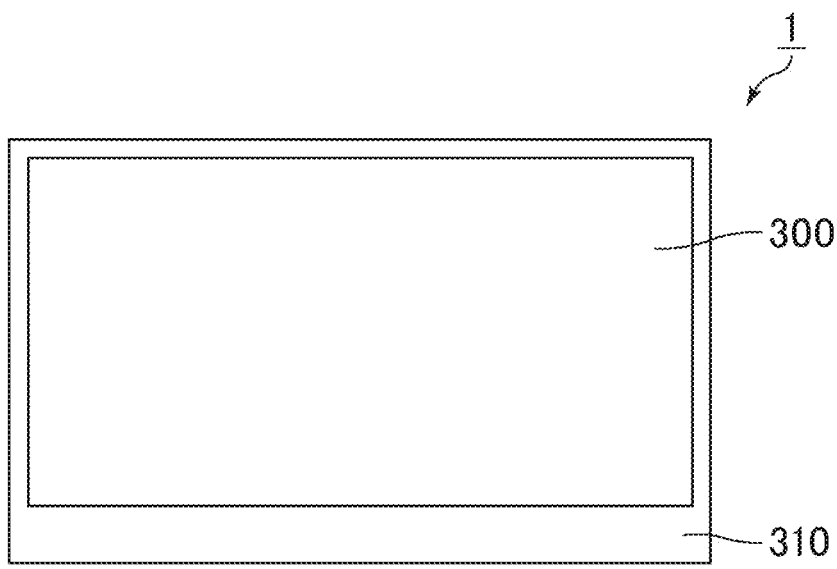
FIG. 2 is a schematic view of the liquid crystal display device shown in FIG. 1 as seen from a viewing screen side.

FIG. 2 is a schematic view of the liquid crystal display device 1 shown in FIG. 1 as seen from the viewing screen side. As shown in FIG. 2, the first substrate 30 has a display area 300 and a frame area 310 placed on the outer edge of the display area 300. The display area 300 is an area where a given image or other visual representations are displayed while the backlight is on. That is, the display area 300 is an area that is seen from the viewing screen side of the liquid crystal display device 1 while the backlight is on. Meanwhile, the frame area 310 is an area placed in the shape of a frame on the outer edge of the display area 300. The frame area 310 does not need to transmit light. The ink layer 2 is provided between the frame area 310 and the polarizing plate 11 (see FIG. 1).

Polarizing Plate

Although a polarizing axis of the first polarizing plate 11 and a polarizing axis of the second polarizing plate 12 may be arranged orthogonal to each other (so-called crossed Nicol arrangement) or parallel to each other (so-called parallel Nicol arrangement), it is preferable that they be arranged orthogonal to each other. That is, it is appropriate that the polarizing axis of the second polarizing plate 12 be in a crossed Nicol arrangement with respect to the polarizing axis of the first polarizing plate 11.

In the present embodiment, it is appropriate that the liquid crystal display device not be in a circularly polarized mode but be in a linearly polarized mode. Accordingly, it is preferable that the first polarizing plate 11 and the second polarizing plate 12 be linear polarizing plates. It should be noted that optical films such as phase difference films may be placed between the first polarizing plate 11 and the first substrate 30 and between the second polarizing plate 12 and the second substrate 50. However, from the point of view of the aforementioned preference of a linearly polarized mode, it is appropriate that the liquid crystal display device of the present disclosure have no phase difference films.

The first polarizing plate 11 may be disposed to cover up to three or four sides of the first substrate 30. That is, in a case where the first polarizing plate 11 and the first substrate 30 are quadrangular in planar shape, it is preferable that the first polarizing plate 11 be placed so that three or more sides of the outer edge of the first polarizing plate 11 overlap the outer edge of the first substrate 30 corresponding thereto or are further outward then the outer edge of the first substrate 30. When the outer edge of a polarizing plate is situated further inward than a substrate, a cut at an end of the polarizing plate is seen, with the result that design qualities may not be able to be further enhanced. Possible measures to hide the outer edge of the polarizing plate include a measure of hiding it with a bezel (frame) and a measure of installing an ink-printed cover glass on a frame as in the case of Japanese Patent No. 5226330. However, the former measure makes it difficult to achieve a flat design, and the latter measure needs a cover glass. On the other hand, as noted above, when the first polarizing plate 11 is disposed to cover up to three or four sides of the first substrate 30, a thin and flat design can be achieved. That is, the liquid crystal display device of the present disclosure becomes suitable as a three-side flat or four-side full-flat liquid crystal display device. Further, a narrow frame is expected to bring about further improvement in design qualities. It should be noted that it is more preferable that three or more sides of the outer edge of the first polarizing plate 11 overlap the outer edge (or be aligned with the outer edge) of the first substrate 30 corresponding thereto.

Examples of the first polarizing plate 11 and the second polarizing plate 12 include polarizers (absorption polarizing plates) each stretched and oriented after a polyvinyl alcohol film has been dyed with an anisotropic material such as a iodine complex (or dye) and allowed to adsorb the anisotropic material. In general, for the ensuring of mechanical strength and resistance to moist heat, a polyvinyl alcohol film is put to practical use with protective films such as triacetyl cellulose films stacked on both sides of the polyvinyl alcohol film.

Ink Layer

The ink layer 2 is located between the frame area 310 of the first substrate 30 and the first polarizing plate 11. The ink layer 2 causes the frame area 310 and the first polarizing plate 11 to be bonded together. The ink layer 2 is formed by applying an ink material by printing to the frame area 310 at the reverse side of the first substrate 30 (that faces the first polarizing plate 11). It is preferable that the ink material be heated and/or dried after being applied.

It is appropriate that the material (also referred to as "ink material") of the ink layer 2 have a light blocking effect. A preferred example contains a black pigment and resin. As the black pigment, carbon black is suitable. The resin is not limited to particular resins and needs only be resin for use in ink. It is preferable that the ink material further contain a white pigment for reflectance adjustment, and a suitable example of the white pigment is a metallic substance such as titanium oxide. Further, it is appropriate to further contain a curing agent. For example, in a case where polyurethan resin is used as the resin, it is preferable that the curing agent be composed mainly of a material having an isocyanate group. The curing agent may be contained in any proportion, and for example, it is appropriate that the curing agent be contained in 5 to 15 parts by mass to 100 parts by mass of the principal ingredients (i.e. the pigment and the resin) of the ink material. Alternatively, a commercially available ink material may be used. Examples of such commercially available ink materials include a screen printing ink (e.g. a polyurethane ink) manufactured by Seiko Advance Ltd. The ink layer is not limited to particular thicknesses, but for example, it is preferable that the thickness of a thickest portion of the ink layer range from 500 nm to 10 μm. It is more preferable that the thickness of the thickest portion range from 1 to 5 μm.

Substrate

Figure 3:
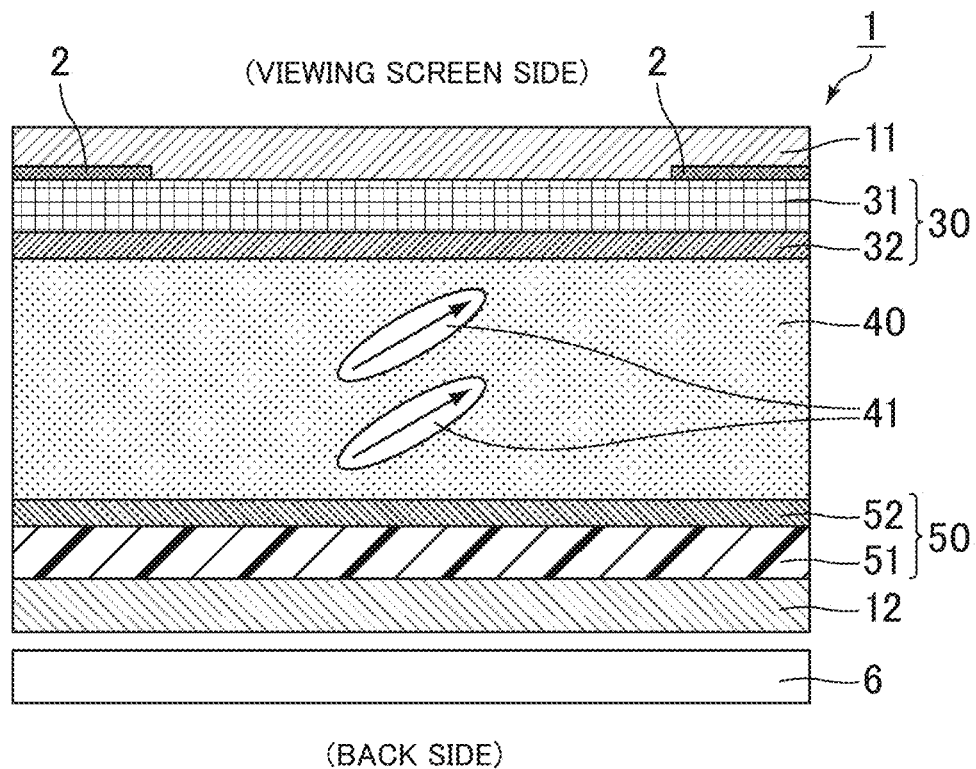
FIG. 3 is a cross-sectional schematic view showing in more detail the liquid crystal display device shown in FIG. 1.

FIG. 3 is a cross-sectional schematic view showing in more detail the liquid crystal display device shown in FIG. 1, i.e. a cross-sectional schematic view showing the substrates in more detail. The first substrate 30 includes an insulating substrate (also referred to as "insulating film") 31, various wires formed on top of the insulating substrate 31, a pixel electrode 32 formed on top of the insulating substrate 31, a thin-film transistor (TFT), or other components. In the display area 300, a plurality of gate lines extended parallel to one another along a row-wise direction and a plurality of source lines extended parallel to one another along a direction intersecting each gate line via the insulating film 31 (i.e. along a column-wise direction) are provided on top of the insulating substrate 31. The plurality of gate lines and the plurality of source lines are formed in a grid pattern as a whole so as to divide pixels from one another. The TFT, which serves as a switching element, is placed at the intersection of each source line and each gate line. The pixel electrode 32, which is connected to the TFT by a drain wire, is placed within a pixel area. A plurality of the pixel electrodes 32 are arranged in rows and columns in a matrix. The first substrate 30 may be one that is commonly used, for example, as a TFT substrate in the field of liquid crystal display panels.

The second substrate 50 is placed opposite the first substrate 30 with the liquid crystal layer 40 sandwiched therebetween. The second substrate 50 includes an insulating substrate (also referred to as "insulating film") 51 and a common electrode 52. The common electrode 52 is disposed to face the pixel electrode 32 across the liquid crystal layer 40. A display can be carried out by forming a longitudinal electric field between the common electrode 52 and the pixel electrode 32 and tilting the liquid crystal molecules 41. That is, the liquid crystal display device of Embodiment 1 is in a longitudinal electric field mode in which an electric field is applied in a direction parallel with the thickness of the liquid crystal layer 40 (or an out-of-plane direction). Examples of the longitudinal electric field mode include a TN (twisted nematic) mode and a VA (vertical alignment) mode.

The pixel electrode 32 and the common electrode 52 may be transparent electrodes. For example, the pixel electrode 32 and the common electrode 52 may be formed by a transparent conductive material such as indium tin oxide (ITO), indium zinc oxide (IZO), zinc oxide (ZnO), or tin oxide (SnO) or an alloy thereof. Further, as the insulating substrates 31 and 51, insulating transparent substrates made of a material such as glass is suitably used.

Either the first substrate 30 or the second substrate 50 may be a substrate including color filters. Neither of them may include color filters. In a case where the first substrate 30 includes color filters, the first substrate 30 is in a form called "color filter on array". Further, the liquid crystal display device according to the present embodiment may be a monochrome display or a field sequential color (FFS) type. In these cases, there is no need for color filters.

Figure 4:
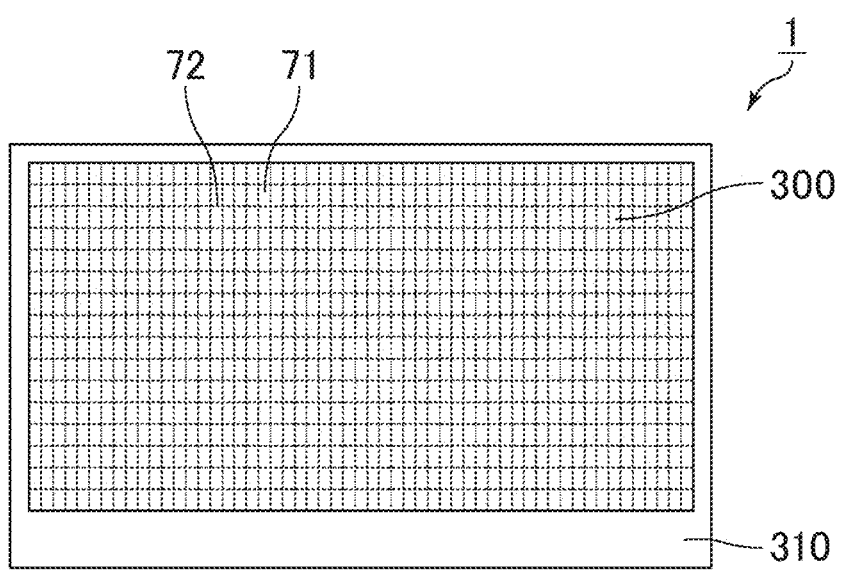
FIG. 4 is a schematic view of an aspect of the liquid crystal display device shown in FIG. 3 in which a second substrate has color filters, as seen from the viewing screen side.

In a case where the first substrate 30 or the second substrate 50 includes color filters, the first substrate 30 or the second substrate 50 may for example be configured such that a black matrix 72 formed in a grid pattern and color filters 71 or other components formed inside grid squares (i.e. pixels) are provided on top of the insulating substrate 31 or 51. The black matrix 72 may be formed in a grid pattern for every one pixel so as to overlap boundaries of the pixels or may be formed in a grid pattern for every half pixel so as to cut across the center of one pixel along a direction parallel with a short side. The color filters may be arranged, for example, in the order of red (R), green (G), and blue (B), in the order of yellow (Y), red (R), green (G), and blue (B), or in the order of red (R), green (G), blue (B), and green (G) for each column. It should be noted that FIG. 4 is a schematic view of an aspect of the liquid crystal display device shown in FIG. 3 in which the second substrate 50 has color filters, as seen from the viewing screen side.

Liquid Crystal Layer

The liquid crystal layer 40 contains the liquid crystal molecules 41. The amount of transmitted light is controlled by applying a voltage to the liquid crystal layer 40 and changing the state of alignment of the liquid crystal molecules 41 in the liquid crystal material according to the voltage thus applied. The liquid crystal molecules 41 may be positive or negative in value of dielectric constant anisotropy ($\Delta_\varepsilon$) defined by Formula (4) as follows:

$$\Delta_\varepsilon = \text{(Longitudinal Axis Dielectric Constant)} - \text{(Short Axis Dielectric Constant)} \quad (4)$$

Liquid crystal molecules having positive dielectric constant anisotropy are also referred to as "positive liquid crystal", and liquid crystal molecules having negative dielectric constant anisotropy are also referred to as "negative liquid crystal". It should be noted that the long axis direction of a liquid crystal molecule is a direction parallel with a slow axis. Liquid crystal molecules homogeneously align themselves in a state where a voltage is not applied (i.e. in the absence of the application of a voltage), and the direction of the long axis of a liquid crystal molecule in the no-voltage application state is also referred to as "direction of initial alignment of liquid crystal molecules". In FIGS. 1 and 3, the arrow inside a liquid crystal molecule 41 represents an alignment vector (liquid crystal molecule orientation) whose initial point is a long axis end of the liquid crystal molecule 41 that points toward the second substrate 50 and whose final point is a long axis end of the liquid crystal molecule 41 that points toward the first substrate 30. Although, for convenience, FIGS. 1 and 3 show an embodiment in which the orientation of a liquid crystal molecule is parallel with the direction of the short axis of a substrate, the present disclosure is not limited to particular liquid crystal display modes or particular directions of alignment (orientations) of liquid crystal molecules. The liquid crystal display device of the present disclosure can bring about an effect of giving a sense of congruity in outward appearance being superior in design qualities regardless of liquid crystal display mode or direction of alignment of liquid crystal molecules.

The liquid crystal molecules 41 contained in the liquid crystal layer 40 align themselves substantially perpendicularly in the absence of the application of a voltage. That the liquid crystal molecules 41 align themselves substantially perpendicularly means that in the absence of the application of a voltage to the liquid crystal layer 40 (i.e. in a case where a voltage applied to the liquid crystal layer 40 is lower than a threshold voltage), the liquid crystal molecules 41 in the liquid crystal layer 40 align themselves substantially perpendicularly to a principal surface of each of the first and second substrates 30 and 50). The presence of the application of a voltage between the common electrode and the pixel electrode is herein simply referred to as "presence of the application of a voltage", and the absence of the application of a voltage between the common electrode and the pixel electrode is herein simply referred to as "absence of the application of a voltage".

Reflectance

The liquid crystal display device 1 has an internal reflectance ratio y of 0.2 to 0.3, and the internal reflectance ratio y is expressed by Formula (1-1) above. This makes it possible to achieve a liquid crystal display device with good design qualities that gives a sense of congruity in outward appearance between the display area 300 and the frame area 310. A preferred lower limit of the internal reflectance ratio y is 0.1, and a preferred upper limit of the internal reflectance ratio y is 0.5.

Further, it is preferable that the liquid crystal display device 1 have an internal reflectance ratio x of 0.2 to 0.3 and that the internal reflectance ratio x be expressed by Formula (2-1) above. When the internal reflectance ratio y and the internal reflectance ratio x are close to each other, colors match better, so that a greater sense of congruity in outward appearance can be achieved. From this point of view, it is preferable that the ratio (x/y) of the internal reflectance ratio x and the internal reflectance ratio y range from 0.95 to 1.05. It is more preferable that the ratio (x/y) range from 0.97 to 1.03. It is further preferable that the ratio (x/y) range from 0.99 to 1.01. It is most preferable that the ratio (x/y) be 1, i.e. that the internal reflectance ratio y and the internal reflectance ratio x are equal to each other.

Further, it is preferable that the liquid crystal display device 1 have an internal reflectance ratio z of 0.2 to 0.3 and that the internal reflectance ratio z be expressed by Formula (3-1) above. When the internal reflectance ratio y and the internal reflectance ratio z are close to each other, colors match better, so that a greater sense of congruity in outward appearance can be achieved. From this point of view, it is preferable that the ratio (z/y) of the internal reflectance ratio z and the internal reflectance ratio y range from 0.95 to 1.05. It is more preferable that the ratio (z/y) range from 0.97 to 1.03. It is further preferable that the ratio (z/y) range from 0.99 to 1.01. It is most preferable that the ratio (z/y) be 1, i.e. that the internal reflectance ratio y and the internal reflectance ratio z are equal to each other.

Figure 5:
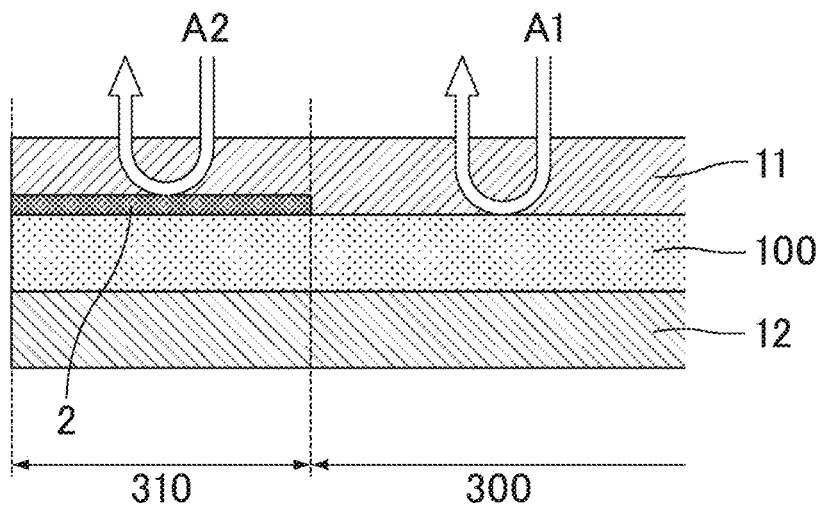
FIG. 5 is a diagram for explaining the reflectance of a frame area and the reflectance of a display area.

In Formulas (1-2), (2-2), and (3-2) above, "Reflectance of Frame Area" is a reflectance expressed by the X, Y, or Z value of XYZ color coordinates, and is a reflectance A2 measured from the side of the first polarizing plate for part of the polarizing plate above the frame area after configuring (fabricating) the liquid crystal display panel. That is, "Reflectance of Frame Area" can also be referred to as "Reflectance of First Polarizing Plate above Frame Area". Specifically, as shown in FIG. 5, the reflectance of the first polarizing plate 11 above the frame area 310 is measured from the side of the first polarizing plate 11 after fabricating the liquid crystal display panel 100. The first polarizing plate 11 and the second polarizing plate 12 are in a crossed Nicol arrangement. This is referred to as "Reflectance of Frame Area" (A2). Of such reflectances, reflectances expressed by the X, Y, and Z values of XYZ color coordinates are denoted by $X_{A2}$, $Y_{A2}$, and $Z_{A2}$, respectively. It should be noted that FIG. 5 is a diagram for explaining the reflectance A2 of the frame area and the reflectance A1 of the display area.

The term "liquid crystal display panel" herein means a structural portion (structural body) of a liquid crystal display device sandwiched between a pair of substrates and for example, in FIG. 1, means a portion of the liquid crystal display device from the first substrate 30 to the second substrate 50 (i.e. a portion of the liquid crystal display device composed of the first substrate 30, the liquid crystal layer 40, and the second substrate 50). The polarizing plates, the backlight, or other components located outside the pair of substrates are not included.

In Formulas (1-3), (2-3), and (3-3) above, "Reflectance of Display Area" is a reflectance expressed by the X, Y, or Z value of XYZ color coordinates, and is a reflectance A1 measured from the side of the first polarizing plate for part of the polarizing plate above the display area after configuring (fabricating) the liquid crystal display panel. That is, "Reflectance of Display Area" can also be referred to as "Reflectance of First Polarizing Plate above Display Area". Specifically, as shown in FIG. 5, the reflectance of the first polarizing plate 11 above the display area 300 is measured from the side of the first polarizing plate 11 after fabricating the liquid crystal display panel 100. This is referred to as "Reflectance of Display Area" (A1). Of such reflectances, reflectances expressed by the X, Y, and Z values of XYZ color coordinates are denoted by $X_{A1}$, $Y_{A1}$, and $Z_{A1}$, respectively. Note here that the reflectance A2 of the frame area and the reflectance A1 of the display area may vary according to the type of liquid crystal display panel and the presence or absence of an ink layer.

Figure 6:
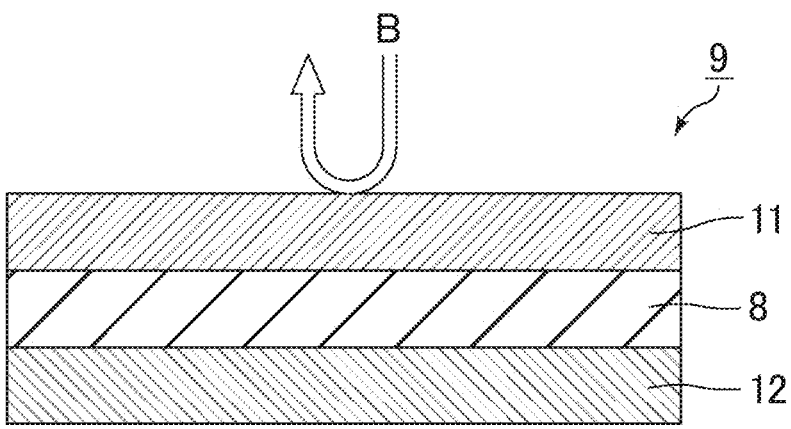
FIG. 6 is a diagram for explaining the surface reflectance of a first polarizing plate.

Further, as shown in FIG. 6, the first polarizing plate 11 is bonded to one surface of glass 8, and the second polarizing plate 12 is bonded to the other surface of the glass 8. In so doing, the polarizing plates are bonded so that their polarizing axes are in a crossed Nicol arrangement. For the layered product 9 thus fabricated (layered product that serves as a measurement reference), a reflectance B is measured from the side of the first polarizing plate 11. This is referred to as "Surface Reflectance of First Polarizing Plate" (B). Of such reflectances, reflectances expressed by the X, Y, and Z values of XYZ color coordinates are denoted by $X_B$, $Y_B$, and $Z_B$, respectively. As the glass 8, normal, common glass needs only be used. It should be noted that FIG. 6 is a diagram for explaining the surface reflectance B of the first polarizing plate. Note here that the surface reflectance B of the first polarizing plate remains the same regardless of the type of liquid crystal display panel or the presence or absence of an ink layer, as long as the same polarizing plate is used as the first polarizing plate. That is, the surface reflectance of the first polarizing plate can be said to be substantially a value that is unique to the polarizing plate.

Figure 7:
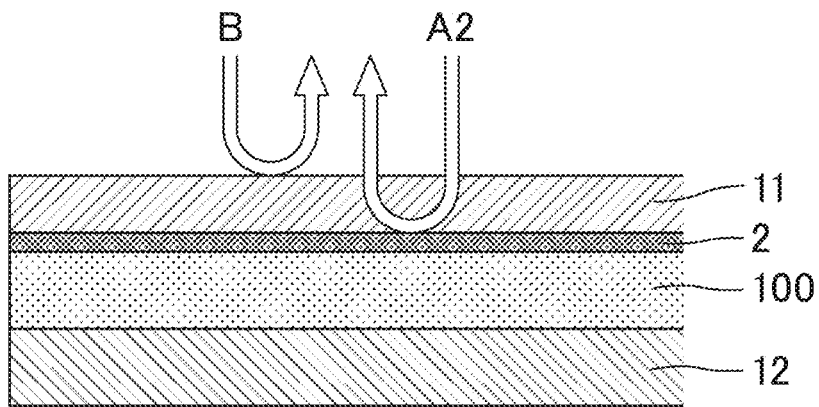
FIG. 7 is a diagram conceptually showing the difference between the reflectance of the frame area and the surface reflectance of the first polarizing plate.

FIG. 7 conceptually shows the difference between the reflectance (A2) of the frame area and the surface reflectance (B) of the first polarizing plate. In general, values of measurement of a structural body in which a liquid crystal display panel is sandwiched between a pair of polarizing plates include the reflectance of a polarizing plate surface (e.g., in FIG. 7, the surface reflectance B of the first polarizing plate 11). As mentioned above, this reflectance of a polarizing plate surface remains the same regardless of the type of liquid crystal display panel or the presence or absence of an ink layer, as long as the same polarizing plate is used. Therefore, when the reflectance of the display area and the reflectance of the frame area are compared, a comparison needs to be made between internal reflectances not including this reflectance of a polarizing plate surface (e.g., in FIG. 7, the reflectance A2 of the frame area). Accordingly, in the present disclosure, the internal reflectances $Y_2$ and $Y_1$ were calculated, and the ratio y thereof was defined.

The term "reflectance" herein means a reflectance based on SCI (Specular Component Include) measurement mode. A measurement of a reflectance involves the use of a spectrophotometric colorimeter. As the spectrophotometric colorimeter, for example, Konica Minolta's "CM-2600d" (product name) is suitably used.

Figure 11:
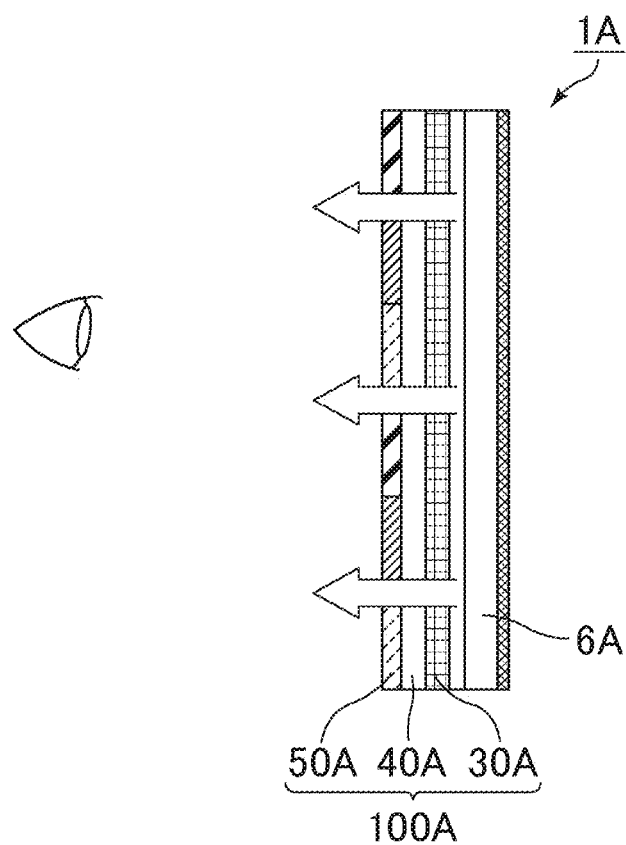
FIG. 11 is a cross-sectional schematic view of a common liquid crystal display device.
Figure 12:
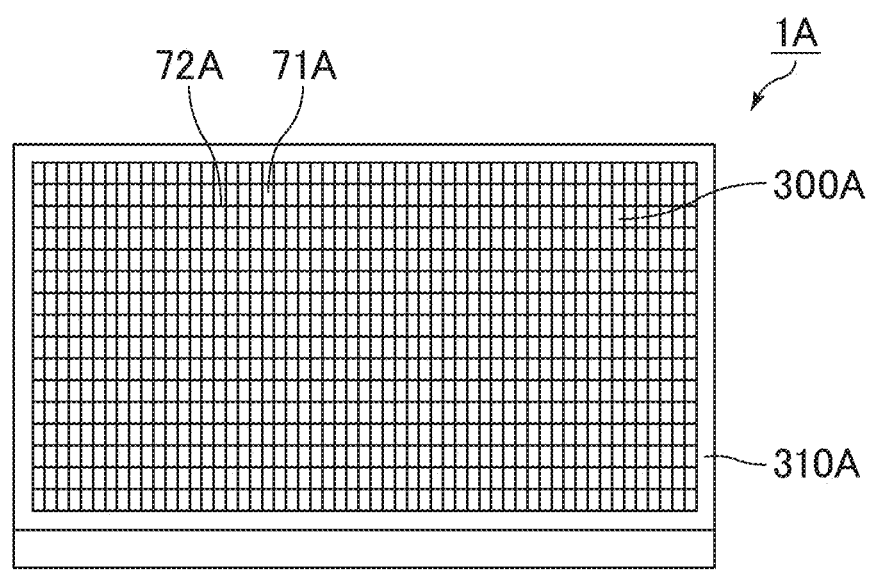
FIG. 12 is a schematic view of the liquid crystal display device shown in FIG. 11 as seen from a viewing screen side.
Figure 13:
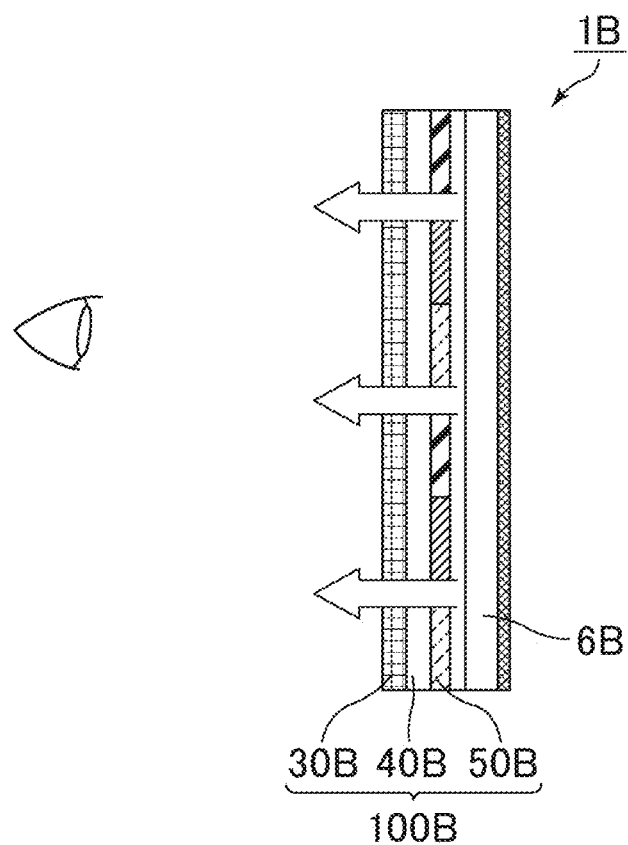
FIG. 13 is a cross-sectional schematic view of a liquid crystal display device of a reversed structure.

The liquid crystal display device 1 has the first polarizing plate 11 and the first substrate 30 at the viewing screen side. In such a structure, there is no need for a cover glass. The term "cover glass" means glass, placed closest to the viewing screen side of the liquid crystal display device, that protects members or other components of the liquid crystal display device. For example, in a case where the common liquid crystal display device 1A shown in FIG. 11 has a cover glass, the cover glass is placed closer to the viewing screen side than the CF substrate 50A. The cover glass is made of a material such as tempered glass. The liquid crystal display device of the present embodiment may have a cover glass, but it is preferable that the liquid crystal display device not have a cover glass. In a case where the liquid crystal display device does not have a cover glass, a lower profile, a lighter weight, and lower cost can be achieved at a higher level.

Usually, resin such as acrylic resin or polycarbonate may be used instead of a cover glass. That is, a resin plate may be used as a protecting member, placed closest to the viewing screen side of the liquid crystal display device, that protects members or other components of the liquid crystal display device. The liquid crystal display device of the present embodiment may have a resin plate as this protecting member, but it is preferable that the liquid crystal display device not have such a resin plate. In this case too, a lower profile, a lighter weight, and lower cost can be achieved at a higher level.

Next, a configuration of the liquid crystal display device of the present embodiment is further described The liquid crystal display device 1 may also include a first alignment film and a second alignment film between the first substrate 30 and the liquid crystal layer 40 and between the second substrate 50 and the liquid crystal layer 40, respectively. It is preferable that the first alignment film and the second alignment film be optical alignment films formed from an optical alignment film material and subjected to an optical alignment process to express a function of aligning the liquid crystal molecules 41 in a particular direction. The term "optical alignment film material" means a material that undergoes a structural change by being irradiated with light (electromagnetic waves) such as ultraviolet light or visible light and that expresses a property (alignment-regulating force) that regulates the alignment of liquid crystal molecules 41 present nearby or any material whose alignment-regulating force changes in magnitude and/or orientation.

The optical alignment film material includes a photoreactive site that undergoes a reaction such as dimerization (dimer formation), isomerization, photo-Fries rearrangement, or decomposition upon light irradiation. Examples of photoreactive sites (functional groups) that undergo dimerization and isomerization upon light irradiation include cinnamate, cinnamoyl, 4-chalcone, coumarin, and stilbene. Examples of photoreactive sites (functional groups) that undergo isomerization upon light irradiation include azobenzene. Examples of photoreactive sites that undergo photo-Fries rearrangement upon light irradiation include a phenol ester structure. Examples of photoreactive sites that undergo decomposition upon light irradiation include a cyclobutane ring-containing dianhydride such as cyclobutane-1,2,3,4-tetracarboxylic-1,2:3,4-dianhydride (CBDA). Further, it is preferable that the optical alignment film material exhibit a vertical alignment property that can be used in a vertical alignment mode. Examples of the optical alignment film material include polyamide (polyamic acid), polyimide, polysiloxane derivatives, methyl methacrylate, and polyvinyl alcohol, which include photoreactive sites.

Further, in the present embodiment, a polymer sustained alignment (PSA) technology may be used. The PSA technology is one with which to form a polymer on surfaces of the first and second alignment films by sealing a liquid crystal composition containing a photopolymerizable monomer in the space between the first substrate 30 and the second substrate 50 and then polymerizing the photopolymerizable monomer by irradiating the liquid crystal layer 40 with light and immobilize the liquid crystals at a pretilt with this polymer.

The backlight 6 is not limited to particular backlights, provided it emits light containing visible light. It may be one that emits light containing only visible light, or may be one that emits light containing both visible light and ultraviolet light. In order for a color display to be possible, a light source that emits white light is suitably used. As a type of backlight, for example, a light-emitting diode (LED) is suitably used. The term "visible light" herein means light (electromagnetic waves) with wavelengths longer than or equal to 380 nm and shorter than 800 nm.

The liquid crystal display device of the present embodiment is constituted by the aforementioned members or other components and a plurality of members such as external circuits such as a TCP (tape carrier package) and a PCB (printed circuit board), optical films such as a wide view film and a brightness enhancement film, and a bezel (frame). A description of members other than the already-described members is omitted, as such members are not limited to particular members and may be ones that are commonly used in the fields of liquid crystal display panels and liquid crystal display devices.

A method for manufacturing a liquid crystal display device of the present embodiment is not limited to particular methods and may be a method that is commonly used in the fields of liquid crystal display panels and liquid crystal display devices. For example, a liquid crystal display panel can be fabricated by bonding the first substrate 30 and the second substrate 50 together with a seal material provided around the liquid crystal layer 40. In this case, the liquid crystal layer 40 is retained in a predetermined area. Usable examples of the seal material include epoxy resin containing an inorganic filler or an organic filler and a curing agent. Further, an alignment process may be performed on the alignment films as the need arises. After the liquid crystal display panel has been obtained, the liquid crystal display device can be obtained by placing the polarizing plates on both sides, respectively, of the liquid crystal display panel (in so doing, it is preferable to form an ink layer as noted above) and placing a backlight behind the second substrate 50.

Embodiment 2

The present embodiment mainly describes features peculiar to the present embodiment and omits to describe contents overlapping those of Embodiment 1. While Embodiment 1 has described a liquid crystal display device of a longitudinal electric field mode, the present embodiment described a liquid crystal display device of a transverse electric field mode in which an electric field is applied in a planar direction (or an in-plane direction) of a liquid crystal layer. Examples of the transverse electric field mode include an FFS (fringe field switching) mode and an IPS (in-plane switching) mode.

As shown in FIGS. 1 and 2, the liquid crystal display device 1 according to the present embodiment too includes, in order from a viewing screen side to a back side, a first polarizing plate 11, a first substrate 30 including a TFT, a liquid crystal layer 40 containing liquid crystal molecules 41, a second substrate 50, a second polarizing plate 12, and a backlight 6, and has an ink layer 2 between a frame area 310 of the first substrate 30 and the first polarizing plate 11.

Substrate

Figure 8:
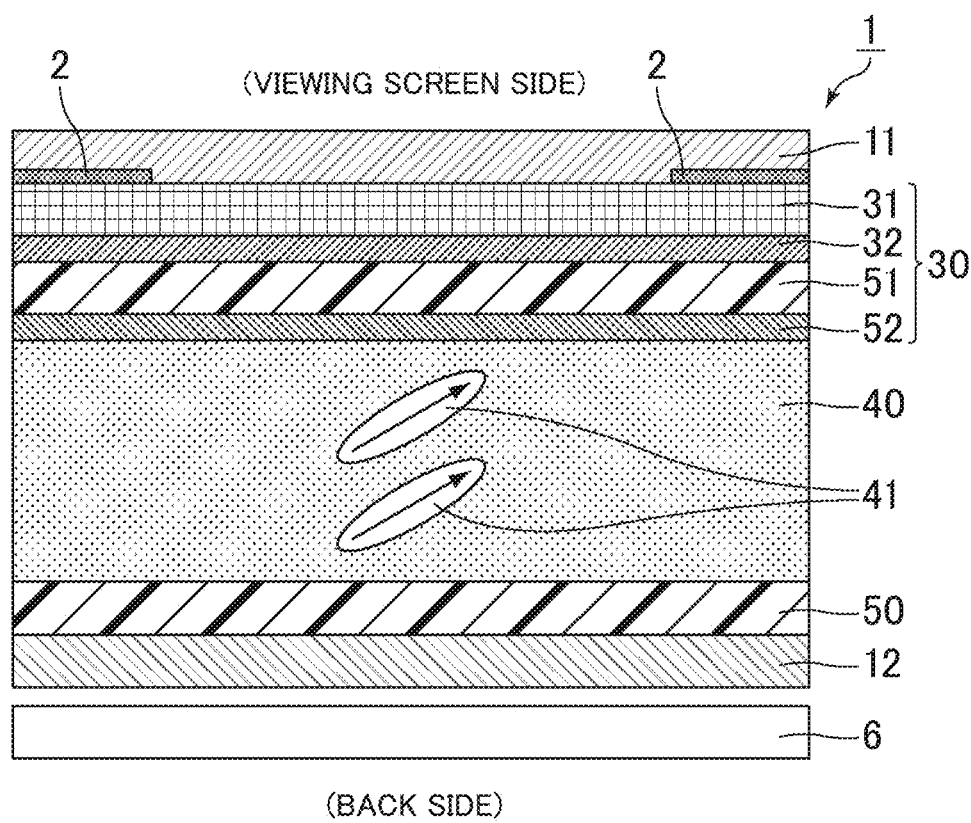
FIG. 8 is a cross-sectional schematic view showing in more detail an example of a liquid crystal display device of Embodiment 2.

FIG. 8 is a cross-sectional schematic view showing in more detail the liquid crystal display device shown in FIG. 1, i.e. a cross-sectional schematic view showing the substrates in the present embodiment in more detail. The first substrate 30 includes a TFT, and has a pixel electrode 32 and a common electrode 52. The common electrode 52 is disposed to face the pixel electrode 32 across an insulating substrate 51. A change in alignment of the liquid crystal molecules 41 is effected by a transverse electric field (particularly a fringe field in the FFS mode) that is generated between the pixel electrode 32 and the common electrode 52, whereby a display can be carried out.

In the liquid crystal display device of the present embodiment of a transverse electric field mode, the second substrate 50 is not limited to particular substrates. For example, a transparent substrate or other substrates are used. As mentioned in Embodiment 1, either the first substrate 30 or the second substrate 50 may be a substrate including color filters, or neither of them may include color filters.

Liquid Crystal Layer

The liquid crystal molecules 41 contained in the liquid crystal layer 40 align themselves substantially parallel in the absence of the application of a voltage. That the liquid crystal molecules 41 align themselves substantially parallel means that in the absence of the application of a voltage to the liquid crystal layer 40 (i.e. in a case where a voltage applied to the liquid crystal layer 40 is lower than a threshold voltage), the liquid crystal molecules 41 in the liquid crystal layer 40 align themselves substantially parallel to a principal surface of each of the first and second substrates 30 and 50).

While the foregoing has described embodiments of the present disclosure, all of the individual matters thus described may be applied to the present disclosure in general.

While the following describes the present disclosure in more detail with reference to examples and comparative examples, the present disclosure is not limited only to these examples. Reflectances were measured by the aforementioned method, and the spectrophotometric colorimeter used was Konica Minolta's "CM-2600d" (product name).

Test Example 1

Examples 1-1 and 1-2 and Comparative Examples 1-2 and 1-3

Liquid crystal display devices having the same configuration as that shown in FIGS. 3 and 4 were fabricated. Specifically, first, FHD (full high-definition) liquid crystal display panels were each fabricated by using a TFT substrate as the first substrate 30, using a CF substrate as the second substrate 50, and bonding these two substrates together with the liquid crystal layer 40 sandwiched therebetween. A frame area at the reverse side of the TFT substrate of each of these liquid crystal display panels was coated with an ink material. After that, the polarizing plates 11 and 12 were bonded to back surfaces of the TFT and CF substrates, respectively, so that the polarizing plates 11 and 12 were in a crossed Nicol arrangement, and were incorporated into a backlight module so that the CF substrate faced toward the backlight. As the polarizing plates 11 and 12, Nitto Denko Corporation's "CVT-1764FCUHC" polarizing plates were used. For the polarizing plate 11, surface reflectances B were calculated as $X_B=4.4\%$, $Y_B=4.6\%$, and $Z_B=5.1\%$ according to the aforementioned method (see FIG. 6).

In each of the examples and comparative examples, a polyurethan screen printing ink (manufactured by Seiko Advance Ltd) containing carbon black, titanium oxide, and a curing agent was used as the ink material. In so doing, reflectances were varied by changing the content of titanium oxide so that A<B<C<D (with D being highest) (see Table 1). The coating with the ink material was performed by coating the frame area at the reverse side of the TFT substrate with the ink material by screen printing, heating the ink material at 60°, and drying the ink material. Thus, an ink layer 2 having a film thickness of 3 μm was formed.

Comparative Example 1-1

A liquid crystal display device that is the same in configuration as Examples 1-1 and 1-2 and Comparative Examples 1-2 and 1-3 was fabricated, except that no ink layer 2 was provided.

For each of the liquid crystal display devices obtained in the respective examples and comparative examples, the reflectance $Y_{A2}$ of the first polarizing plate above the frame area was measured. Results are shown in Table 1. Further, the surface reflectance $Y_B$ of the first polarizing plate measured 4.6%. The internal reflectance $Y_2$ of the frame area was calculated by subtracting $Y_B$ from $Y_{A2}$. Results are shown in Table 1.

TABLE 1

|  | Ink | Reflectance of Frame Area $Y_{A2}$ | Internal Reflectance of Frame Area $Y_2$ |
| --- | --- | --- | --- |
| Comparative Example 1-1 | None | 9.0% | 4.4% |
| Comparative Example 1-2 | A | 4.8% | 0.2% |
| Example 1-1 | B | 5.5% | 0.9% |
| Example 1-2 | C | 5.9% | 1.3% |
| Comparative Example 1-3 | D | 7.0% | 2.4% |

Test Example 2

Examples 2-1 and 2-2 and Comparative Examples 2-2 and 2-3

Liquid crystal display devices having the same configuration as that shown in FIGS. 3 and 4 were each fabricated. Specifically, first, UHD (ultrahigh-definition) liquid crystal display panels were each fabricated by using a TFT substrate as the first substrate 30, using a CF substrate as the second substrate 50, and bonding these two substrates together with the liquid crystal layer 40 sandwiched therebetween. A frame area at the reverse side of the TFT substrate of each of these liquid crystal display panels was coated with an ink material. After that, the polarizing plates 11 and 12 were bonded to back surfaces of the TFT and CF substrates, respectively, so that the polarizing plates 11 and 12 were in a crossed Nicol arrangement, and were incorporated into a backlight module so that the CF substrate faced toward the backlight. The polarizing plates 11 and 12 are the same as those of Test Example 1, and surface reflectances B of the polarizing plate 11 are as mentioned above.

In each of the examples and comparative examples, an ink containing carbon black, titanium oxide, and a curing agent was used as the ink material. In so doing, reflectances were varied by changing the content of titanium oxide so that E<F<G<H (with H being highest) (see Table 2). The coating method and the film thickness are the same as those of Test Example 1.

Comparative Example 2-1

A liquid crystal display device that is the same in configuration as Examples 2-1 and 2-2 and Comparative Examples 2-2 and 2-3 were fabricated, except that no ink layer 2 was provided.

For each of the liquid crystal display devices obtained in the respective examples and comparative examples, the reflectance $Y_{A2}$ of the first polarizing plate above the frame area was measured. Results are shown in Table 2. Further, the surface reflectance $Y_B$ of the first polarizing plate measured 4.6%. The internal reflectance $Y_2$ of the frame area was calculated by subtracting $Y_B$ from $Y_{A2}$. Results are shown in Table 2.

TABLE 2

| | Ink | Reflectance of Frame Area $Y_{A2}$ | Internal Reflectance of Frame Area $Y_2$ |
|---|---|---|---|
| Comparative Example 2-1 | None | 10.7% | 6.1% |
| Comparative Example 2-2 | E | 4.8% | 0.2% |
| Comparative Example 2-3 | F | 5.2% | 0.6% |
| Example 2-1 | G | 6.1% | 1.5% |
| Example 2-2 | H | 6.4% | 1.8% |

Test Example 3

Examples 3-1 and 3-2 and Comparative Examples 3-2 and 3-3

Liquid crystal display devices having the same configuration as that shown in FIGS. 3 and 4 were fabricated. Specifically, first, UHD liquid crystal display panels differing from those of Test Example 2 were each fabricated by using a TFT substrate as the first substrate 30, using a CF substrate as the second substrate 50, and bonding these two substrates together with the liquid crystal layer 40 sandwiched therebetween. A frame area at the reverse side of the TFT substrate of each of these liquid crystal display panels was coated with an ink material. After that, the polarizing plates 11 and 12 were bonded to back surfaces of the TFT and CF substrates, respectively, so that the polarizing plates 11 and 12 were in a crossed Nicol arrangement, and were incorporated into a backlight module so that the CF substrate faced toward the backlight. The polarizing plates 11 and 12 are the same as those of Test Example 1, and surface reflectances B of the polarizing plate 11 are as mentioned above.

In each of the examples and comparative examples, an ink containing carbon black, titanium oxide, and a curing agent was used as the ink material. In so doing, reflectances were varied by changing the content of titanium oxide so that I<J<K<L (with L being highest) (see Table 3). The coating method and the film thickness are the same as those of Test Example 1.

Comparative Example 3-1

A liquid crystal display device that is the same in configuration as Examples 3-1 and 3-2 and Comparative Examples 3-2 and 3-3 were fabricated, except that no ink layer 2 was provided.

For each of the liquid crystal display devices obtained in the respective examples and comparative examples, the reflectance $Y_{A2}$ of the first polarizing plate above the frame area was measured. Results are shown in Table 3. Further, the surface reflectance $Y_B$ of the first polarizing plate measured 4.6%. The internal reflectance $Y_2$ of the frame area was calculated by subtracting $Y_B$ from $Y_{A2}$. Results are shown in Table 3.

TABLE 3

| | Ink | Reflectance of Frame Area $Y_{A2}$ | Internal Reflectance of Frame Area $Y_2$ |
|---|---|---|---|
| Comparative Example 3-1 | None | 10.6% | 6.0% |
| Comparative Example 3-2 | I | 4.8% | 0.2% |
| Example 3-1 | J | 5.8% | 1.2% |
| Example 3-2 | K | 6.1% | 1.5% |
| Comparative Example 3-3 | L | 10.0% | 5.4% |

Evaluation Test

Figure 9:
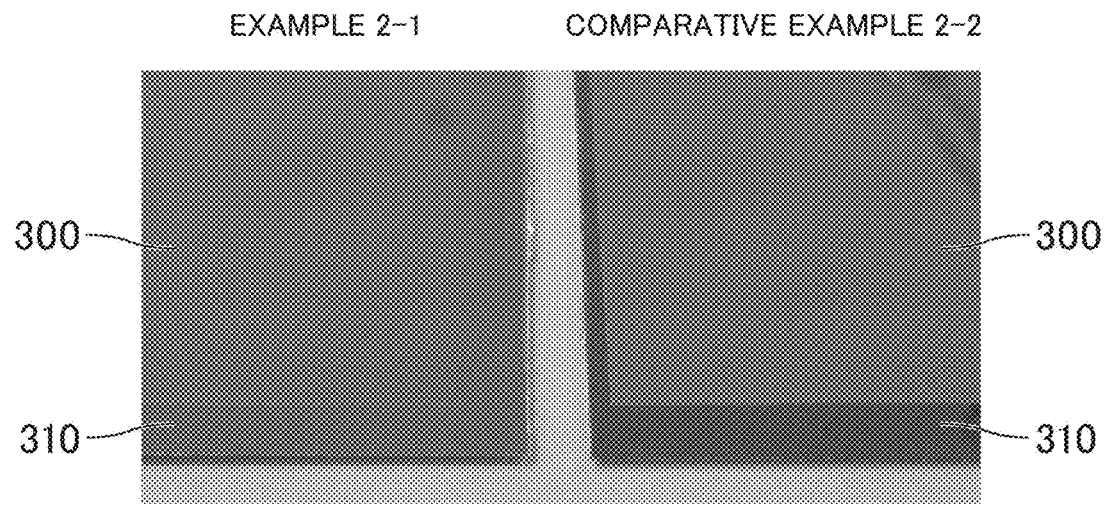
FIG. 9 is a photograph taken of liquid crystal display panels of Example 2-1 and Comparative Example 2-2 under an evaluation test.

For each of the liquid crystal display devices obtained in the respective examples and comparative examples, the reflectance $Y_{A1}$ and internal reflectance $Y_1$ of the display area were measured too, whereby the internal reflectance ratio y was calculated. Results are shown in Table 4. Further, each of the liquid crystal display devices obtained in the respective examples and comparative examples was evaluated for a sense of patterning of the frame area and a sense of congruity in outward appearance. Specifically, the display module (i.e. a part composed of the liquid crystal display panel and the polarizing plates 11 and 12 bonded to both sides, respectively, of the liquid crystal display panel) of each of the liquid crystal display devices obtained in the respective examples and comparative examples was placed on a desk under an environment of 400 lux and subjected to visual observations. Then, evaluations were made on the basis of the following criteria for judgment. Results of judgment are shown in Table 4. For example, FIG. 9 shows a photograph taken of the liquid crystal display panels of Example 2-1 and Comparative Example 2-2 under the evaluation test.

(Sense of Patterning in Frame Area)
  ○: No linear pattern seen in frame area 310.
  x: Linear pattern seen in frame area 310.
(Judgment as to Sense of Congruity in Outward Appearance)
  ○: Sense of congruity in outward appearance between display area 300 and frame area 310.
  x: No sense of congruity in outward appearance between display area 300 and frame area 310, which were clearly differentiated from each other.

TABLE 4

| | Ink | Sense of Patterning in Frame Area | Internal Reflectance Ratio y | Judgement |
|---|---|---|---|---|
| Comparative Example 1-1 | None | x | NA | x |
| Comparative Example 1-2 | A | ○ | 0.04 | x |
| Example 1-1 | B | ○ | 0.20 | ○ |
| Example 1-2 | C | ○ | 0.30 | ○ |
| Comparative Example 1-3 | D | ○ | 0.53 | x |
| Comparative Example 2-1 | None | x | NA | x |
| Comparative Example 2-2 | E | ○ | 0.03 | x |
| Comparative Example 2-3 | F | ○ | 0.10 | x |
| Example 2-1 | G | ○ | 0.24 | ○ |
| Example 2-2 | H | ○ | 0.30 | ○ |

TABLE 4-continued

|  | Ink | Sense of Patterning in Frame Area | Internal Reflectance Ratio y | Judgement |
| --- | --- | --- | --- | --- |
| Comparative Example 3-1 | None | × | NA | × |
| Comparative Example 3-2 | I | ○ | 0.03 | × |
| Example 3-1 | J | ○ | 0.20 | ○ |
| Example 3-2 | K | ○ | 0.25 | ○ |
| Comparative Example 3-3 | L | ○ | 0.89 | × |

The liquid crystal display devices obtained in Comparative Examples 1-1, 2-1, and 3-1 have no ink layers 2. In general, the frame area 310 has laid therein (on the right and left sides or the terminal side thereof, in particular) metal wires through which to send electrical signals to the display area 300. In the absence of an ink layer 2, a pattern of the metal wires is not hidden but seen, with the result that a linear pattern is seen in the frame area 310 (see Table 4). Further, there was no sense of congruity in outward appearance between the display area 300 and the frame area 310, which appeared clearly differentiated from each other (see Table 4).

Figure 14:
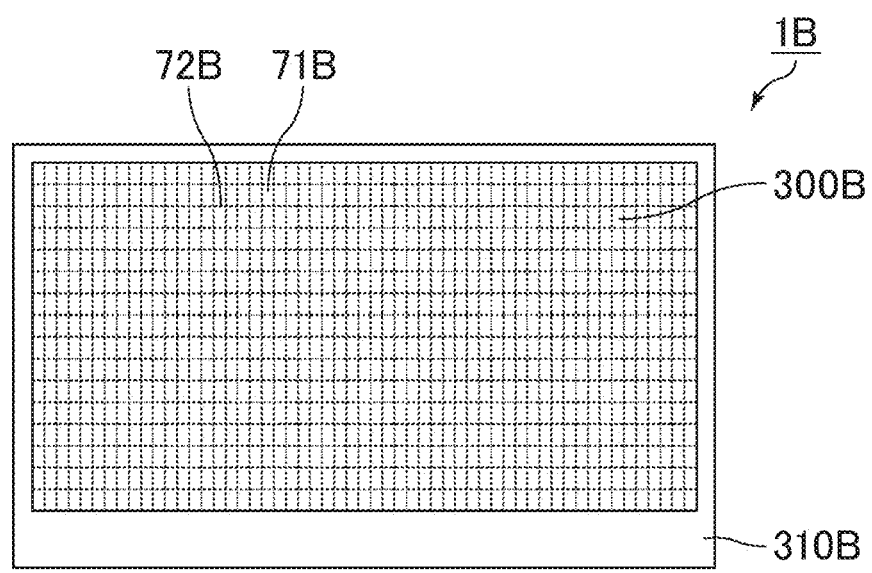
FIG. 14 is a schematic view of the liquid crystal display device shown in FIG. 13 as seen from a viewing screen side.

On the other hand, in each of those comparative examples and examples other than the above, an ink layer 2 is provided between the first substrate 30 and the first polarizing plate 11. However, in some cases, the difference in brightness between the display area 300 and the frame area 310 was seen due to reflections under daylight condition, with the result that no sense of congruity in outward appearance was given (see Comparative Examples 1-2, 1-3, 2-2, 2-3, 3-2, and 3-3 and FIG. 9). In this case, design qualities are impaired (see FIG. 14 too).

Figure 10A:
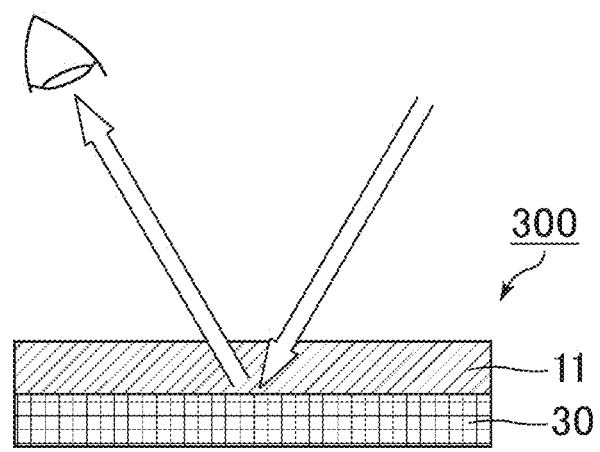
FIG. 10A is a diagram for explaining the difference in reflection between the display area and the frame area.
Figure 10B:
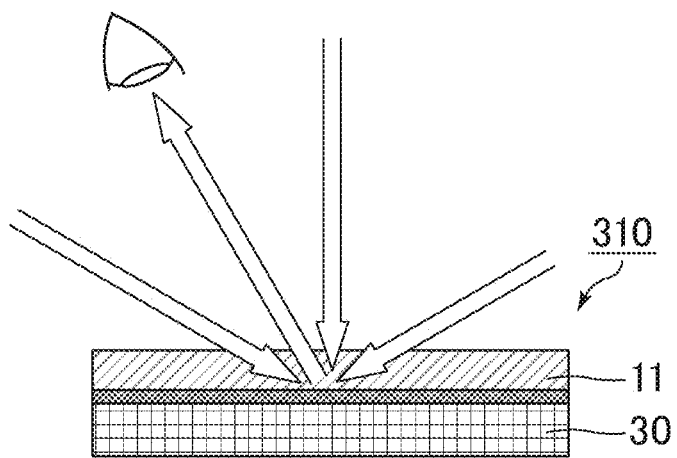
FIG. 10B is a diagram for explaining the difference in reflection between the display area and the frame area.

As mentioned above, such a loss of a sense of congruity in outward appearance is considered to be due to a difference in reflectance. That is, it is considered to be because, in the display area 300, the reflectance of incident light from outside is made higher than that of the ink layer 2 in the frame area 310 due to the effect of the metal wires or other components formed on top of the TFT substrate 30. To address this problem, the inventors came up with an idea of matching reflectances between the display area 300 and the frame area 310, i.e. matching numerical values of the reflectances. However, in this case, the brightness of the frame area 310 is so conspicuous that no sense of congruity in outward appearance is given. This is considered to be due to a difference in reflection. In the display area 300, as shown in FIG. 10A, incident light from outside is regularly reflected mostly by the metal wires or other components formed at the side of the TFT substrate 30. On the other hand, in the frame area 310, as shown in FIG. 10B, the incident light is diffusedly reflected mostly by resin contained in the ink layer. The frame area 310, in which diffuse reflection is predominant, is more susceptible to incident light from outside and therefore tends to look bright. Therefore, no sense of congruity in outward appearance is given even by matching reflectances between the display area 300 and the frame area 310.

On the other hand, each of the liquid crystal display devices obtained in the respective examples had a sense of congruity in outward appearance between the display area 300 and the frame area 310 and exhibited improved design qualities (see Table 4 and FIG. 9). It can also be confirmed from these results that the numerical range (0.2 to 0.3) of the internal reflectance ratio y has critical significance.

For the liquid crystal display device obtained in Example 1-1, the reflectances $X_{A1}$ and $Z_{A1}$ of the display area, the reflectances $X_{A2}$ and $Z_{A2}$ of the frame area, and the surface reflectances $X_B$ and $Z_B$ of the first polarizing plate too were measured as follows:

$$X_{A1} = 8.1\%$$
$$X_{A2} = 5.2\%$$
$$X_B = 4.4\%$$
$$Z_{A1} = 9.6\%$$
$$Z_{A2} = 6.1\%$$
$$Z_B = 5.1\%$$

Consequently, the internal reflectance ratios x and z were calculated as Internal Reflectance Ratio x=0.22 and Internal Reflectance Ratio z=0.22 according to Formulas (2-1) to (2-3) and (3-1) to (3-3) above.

The foregoing aspects of the present disclosure may be appropriately combined without departing from the scope of the present disclosure.

The present disclosure contains subject matter related to that disclosed in Japanese Priority Patent Application JP 2022-067744 filed in the Japan Patent Office on Apr. 15, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a first polarizing plate;
a first substrate including a thin-film transistor;
a liquid crystal layer containing liquid crystal molecules;
a second substate;
a second polarizing plate; and
a backlight,
wherein
the first polarizing plate, the first substate, the liquid crystal layer, the second substrate, the second polarizing plate, and the backlight are arranged in this order,
the first substrate has a display area and a frame area placed on an outer edge of the display area,
the liquid crystal display device has an ink layer between the frame area of the first substrate and the first polarizing plate,
the liquid crystal display device has an internal reflectance ratio y of 0.2 to 0.3,
the internal reflectance ratio y is expressed by Formula (1-1) as follows:

$$y = Y_2/Y_1 \tag{1-1},$$

where $Y_2$ denotes an internal reflectance (%) of the frame area as expressed by a Y value of XYZ color coordinates and $Y_1$ denotes an internal reflectance (%) of the display area as expressed by a Y value of XYZ color coordinates, $Y_2$ and $Y_1$ are calculated by Formulas (1-2) and (1-3), respectively, as follows:

$$Y_2 = Y_{A2} - Y_B \tag{1-2}$$

$$Y_1 = Y_{A1} - Y_B \tag{1-3},$$

where $Y_{A2}$ denotes a reflectance (%) of the frame area, $Y_{A1}$ denotes a reflectance (%) of the display area, and $Y_B$ denotes a surface reflectance (%) of the first polarizing plate.

2. The liquid crystal display device according to claim 1, wherein the liquid crystal display device does not have a cover glass.

3. The liquid crystal display device according to claim 1, wherein the first polarizing plate are disposed to cover up to three or four sides of the first substrate.

4. The liquid crystal display device according to claim 1, wherein the first polarizing plate and the second polarizing plate are linear polarizing plates.

5. The liquid crystal display device according to claim 1, wherein a polarizing axis of the second polarizing plate is in a crossed Nicol arrangement with respect to a polarizing axis of the first polarizing plate.

6. The liquid crystal display device according to claim 1, wherein the ink layer contains carbon black.

7. The liquid crystal display device according to claim 1, wherein the liquid crystal display device has an internal reflectance ratio x of 0.2 to 0.3, the internal reflectance ratio x is expressed by Formula (2-1) as follows:

$$x = X_2/X_1 \tag{2-1}$$

where $X_2$ denotes an internal reflectance (%) of the frame area as expressed by an X value of XYZ color coordinates and $X_1$ denotes an internal reflectance (%) of the display area as expressed by an X value of XYZ color coordinates, $X_2$ and $X_1$ are calculated by Formulas (2-2) and (2-3), respectively, as follows:

$$X_2 = X_{A2} - X_B \tag{2-2}$$

$$X_1 = X_{A1} - X_B \tag{2-3},$$

where $X_{A2}$ denotes a reflectance (%) of the frame area, $X_{A1}$ denotes a reflectance (%) of the display area, and $X_B$ denotes a surface reflectance (%) of the first polarizing plate.

8. The liquid crystal display device according to claim 7, wherein a ratio (x/y) of the internal reflectance ratio x to the internal reflectance ratio y ranges from 0.95 to 1.05.

9. The liquid crystal display device according to claim 1, wherein the liquid crystal display device has an internal reflectance ratio z of 0.2 to 0.3, the internal reflectance ratio z is expressed by Formula (3-1) as follows:

$$z = Z_2/Z_1 \tag{3-1},$$

where $Z_2$ denotes an internal reflectance (%) of the frame area as expressed by a Z value of XYZ color coordinates and $Z_1$ denotes an internal reflectance (%) of the display area as expressed by a Z value of XYZ color coordinates, $Z_2$ and $Z_1$ are calculated by Formulas (3-2) and (3-3), respectively, as follows:

$$Z_2 = Z_{A2} - Z_B \tag{3-2}$$

$$Z_1 = Z_{A1} - Z_B \tag{3-3},$$

where $Z_{A2}$ denotes a reflectance (%) of the frame area, $Z_{A1}$ denotes a reflectance (%) of the display area, and $Z_B$ denotes a surface reflectance (%) of the first polarizing plate.

10. The liquid crystal display device according to claim 9, wherein a ratio (z/y) of the internal reflectance ratio z to the internal reflectance ratio y ranges from 0.95 to 1.05.

\* \* \* \* \*